United States Patent [19]

Shonerd

[11] 4,315,499
[45] Feb. 16, 1982

[54] SELF-COMPENSATING SOLAR COLLECTOR

[76] Inventor: David E. Shonerd, 6 Golden State, Rancho Mirage, Calif. 92270

[21] Appl. No.: 209,336

[22] Filed: Nov. 24, 1980

[51] Int. Cl.³ .............................. F24J 3/02; F28F 7/00
[52] U.S. Cl. .................................. 126/422; 126/445; 126/450; 165/83
[58] Field of Search ............... 126/417, 419, 422, 426, 126/432, 444, 445, 448, 449, 450; 165/81, 82, 83, 34, 35

[56] References Cited

U.S. PATENT DOCUMENTS

| | | | |
|---|---|---|---|
| 3,076,450 | 2/1963 | Gough et al. | 126/444 |
| 4,023,556 | 5/1977 | Sarazin | 126/445 |
| 4,038,967 | 8/1978 | Stout et al. | 126/444 |
| 4,072,188 | 2/1978 | Wilson et al. | 165/83 |
| 4,080,955 | 3/1978 | Sandstrom | 126/426 |
| 4,114,599 | 9/1978 | Stephens | 126/445 |
| 4,151,830 | 5/1979 | Crombie et al. | 126/426 |
| 4,203,425 | 5/1980 | Clark | 126/426 |
| 4,228,790 | 10/1980 | Davison et al. | 126/444 |
| 4,245,619 | 1/1981 | Ogilvie | 126/450 |
| 4,256,087 | 3/1981 | Sowers | 126/426 |
| 4,257,396 | 3/1981 | Reinert | 126/445 |

Primary Examiner—Daniel J. O'Connor
Attorney, Agent, or Firm—Ralph B. Pastoriza

[57] ABSTRACT

The self-compensating solar collector comprises a base tray having inlet and outlet ports at opposite ends covered by a thin metallic diaphragm also serving as an heat absorbing plate. The interior of the tray includes inter-digitating walls or ribs defining a labyrinth channel, fluid flow between the inlet and outlet ports being confined to this labyrinth channel when the top absorber plate is resting on the top of the ribs or walls. Under high heating conditions such as bright sunlight, the plate will heat up and by thermal expansion deflect upwardly with the result that fluid flow can pass over the labyrinth in an expanded flow path directly between the inlet and outlet ports. This increased fluid flow rate results in a cooling of the collector and also in more efficient heat transfer. The same deflection occurs during a cooling cycle wherein the hot fluid flowing under the plate heats the plate to cause it to deflect upwardly so that an increased fluid flow can take place again increasing emission of heat through the absorber plate to the atmosphere at nighttime. The automatic change in the flow rate with temperature changes provides for a more efficient solar collector.

5 Claims, 3 Drawing Figures

SELF-COMPENSATING SOLAR COLLECTOR

This invention relates to passive type flat plate collectors used for both solar heating and for cooling by radiation of heat to the night sky and/or by evaporative cooling.

BACKGROUND OF THE INVENTION

The flat-plate solar collector is the essential piece of equipment used to convert solar radiant energy into a heated fluid. Many configurations of flat-plate collectors have been designed and used. In parts of Australia, Israel and Japan flat-plate collectors are the standard method of providing domestic hot water.

The operation of a flat-plate collector is inherently transient. The driving forces of solar radiation, wind, ambient temperature and weather are continually changing. There is no steady state or equilibrium condition. Therefore, existing flat-plate solar collectors are designed to operate best at some average condition, usually with degraded performance when the solar radiation is at its maximum.

The efficiency of a flat-plate collector is defined as the percent of solar radiation striking the collector which is converted to useful energy. This efficiency drops sharply with a rise in collector temperature. The lower the temperature, the higher the efficiency of collection of solar energy. Collector losses are always minimized when operating at the lowest mean collector temperature. Existing collectors have highest losses when solar radiation is at its maximum.

As the mass flow rate through a collector increases, the temperature rise through the collector decreases. This decrease under high heat solar conditions contributes to good collector performance. Uniform flow rates throughout a collector are also important in obtaining good performance. If the flow is not uniform, parts of the collector will run at significantly higher temperatures with degraded performance. For maximum useful energy gain, the average collector temperature must be minimized. Higher collector temperatures always result in poorer collector performance.

The reliability of flat-plate collectors has been reduced by failures due to pressure surges, freezing and corrosion. Even the earliest sheet-and-tube flat-plate collectors experienced these types of failures; the new configurations in which formed sheets are joined to provide flow passages appear to have an equally high incidence of rupturing.

Noises generated in solar collectors, radiators and heat exchangers are especially bothersome because of the almost continuous pumping of fluids in a solar system used for heating and cooling. For example, in a heating mode or cycle, fluids are pumped through collectors whenever the sun is out. In a cooling mode or cycle, fluids are pumped through collectors at night. In addition, the hot or cold fluids are pumped to radiators or heat exchangers whenever a thermostat signals for higher or lower temperatures in a room.

Some of the foregoing problems might be overcome by providing a separate heat-sensing flow-control valve added to a flat plate collector to increase its efficiency. Such would be possible if the flow channels in the collector were sufficiently large. With such an arrangement, two devices would be needed: one for heating and a different one for cooling. Such a system could become cumbersome as well as expensive.

BRIEF DESCRIPTION OF THE PRESENT INVENTION

With the foregoing considerations in mind, the present invention contemplates the provision of a self-compensating solar collector of the passive type which automatically operates during both heating and cooling cycles to compensate the mass flow rate of fluid through the collector with changes in temperature. As a consequence, the collector is maintained relatively cool and therefore operates at an increased efficiency notwithstanding the heretofore referred to continuous variable environmental conditions.

More particularly, the present invention comprises a collector tray having an inlet and outlet and incorporating means defining a mass fluid flow labyrinth channel between the inlet and outlet. A thermally responsive diaphragm-absorber plate covers the collector tray and moves from a first position confining mass fluid flow to the labyrinth channel to a second upwardly deflected position in response to heating of the diaphragm to an elevated temperature to free the mass fluid flow from the labyrinth channel and thereby provide an expanded fluid flow path.

As a consequence, during both cooling and heating, automatic compensation in the mass flow rate of fluid through the collector with changes in temperature takes place to maintain the collector relatively cool and thereby increase the efficiency of the collector.

In the preferred embodiment, air venting passages may be provided to "short circuit" the labyrinth between the inlet and outlet ports to facilitate venting of air when the absorber diaphragm plate is in its undeflected position.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figure 1:
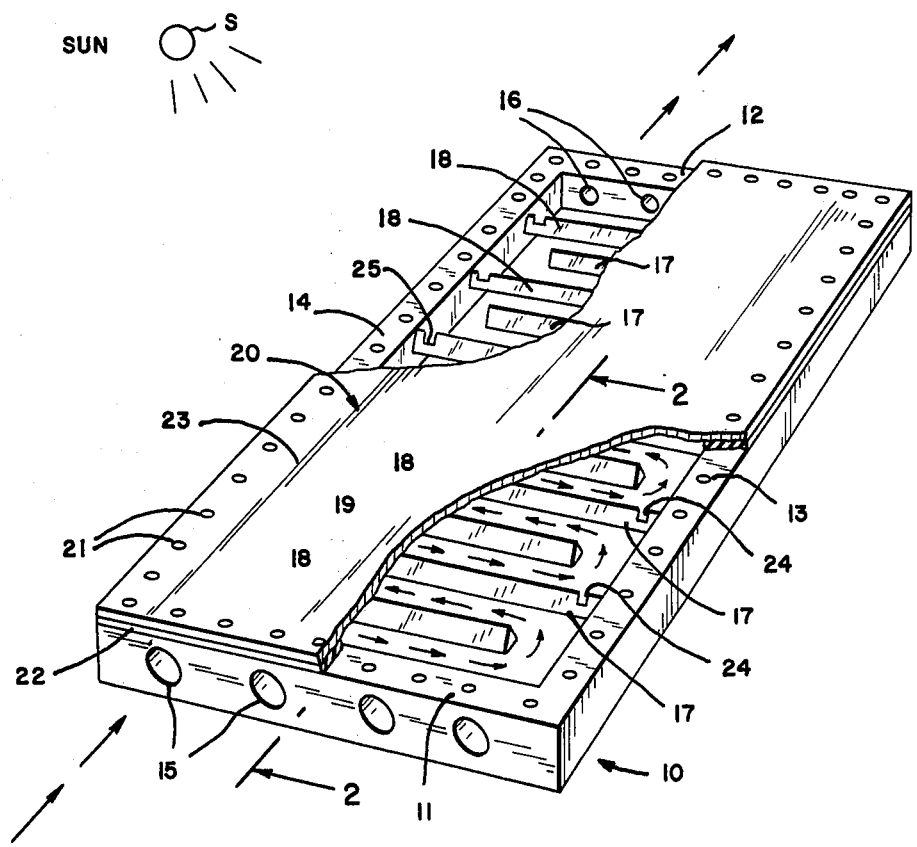
FIG. 1 is a cut-away perspective view of a self-compensating solar collector in accord with the present invention.

Referring first to FIG. 1, the self-compensating solar collector includes a rectangular rigid insulating open top base tray 10 defined by transverse end walls 11 and 12 and longitudinal side walls 13 and 14. Appropriate fluid inlet and outlet ports 15 and 16 are shown passing through the respective transverse end walls 11 and 12.

Within the tray 10, there is provided a first series of transverse ribs 17 having top knife edges and extending from one longitudinal wall of the tray such as the wall 13 across a major portion of the tray width and terminating short of the opposite longitudinal wall such as the wall 14. A second series of parallel transverse ribs having top knife edges similarly extend from the referred to opposite longitudinal wall 18 of the tray across the major portion of the tray width to terminate short of the one longitudinal wall 13. The second series of ribs extend respectively between the first series of ribs in an interdigitating relationship to define a labyrinth flow channel indicated by the arrows 19 between the inlet ports 15 and outlet ports 16.

Still referring to FIG. 1, there is shown a diaphragm absorber plate 20 overlying the open top of the tray 10 with its periphery sealingly secured to the upper ends of the walls of the tray such as by bolts 21 and sealing gasket 22. This diaphragm-absorber plate functions to absorb solar energy as well as emit heat energy therefrom at night. To increase the efficiency of the diaphragm-absorber plate, it may be provided with a coating of highly heat absorbing material such as black paint. Such a coating is indicated at 23.

The diaphragm-absorber plate itself is of a material responsive to changes in its temperature such as a flat steel sheet or aluminum sheet. The arrangement is such that the plate in a first position when its temperature is below a given value will have its under surface resting on and supported by the top knife edges of the ribs 17 and 18 so that mass flow between the inlet and outlet ports is confined to follow the labyrinth flow channel 19 defined by the ribs.

When the temperature of the diaphragm-absorber plate increases above a given value, the plate will deflect upwardly to a second position so that its undersurface separates from the top knife edges of the ribs to provide an expanded direct longitudinal mass flow path across the tops of the ribs between the inlet and outlet ports in addition to the labyrinth flow path.

When the diaphragm-absorber plate is in the first aforementioned position pressing on the top knife edges of the ribs, and it is desired to initiate operation, venting of the air in the collector would be delayed if confined to the labyrinth channel. Therefore, and in accord with a feature of this invention, top portions of the ribs are provided with cut-outs or passages such as indicated at 24 for the ribs 17 and at 25 for the ribs 18, these passages being in longitudinal alignment and serving as venting air passages to provide a direct air passage between the inlet ports and outlet ports. Of course when the diaphragm-absorber plate deflects to its second position, then the air can travel the expanded direct fluid flow path between the inlet and outlet ports.

Figure 2:
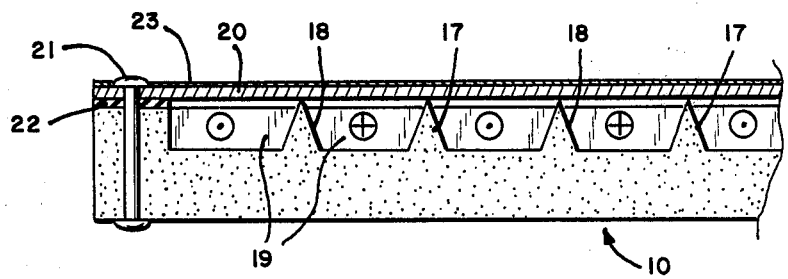
FIG. 2 is an enlarged fragmentary cross section taken in the direction of the arrows 2—2 of FIG. 1 showing the diaphragm-absorber plate of the collector in a first flat plate configuration position.
Figure 3:
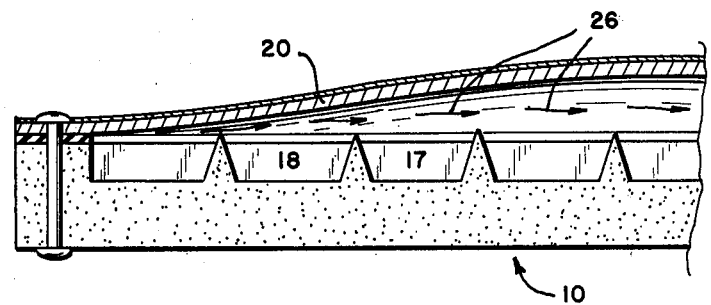
FIG. 3 is a view similar to FIG. 2 but showing the diaphragm-absorber plate in an upwardly deflected position.

The foregoing described first and second positions of the diaphragm-absorber plate as well as structural details of the tray will be better understood by now referring to FIGS. 2 and 3.

In FIG. 2, the plate 20 is shown in its first flat collector position wherein its undersurface engages the top knife edges of the various ribs 17 and 18 to thereby confine mass fluid flow to the labyrinth channel. This fluid flow is indicated by the points and crosses in the labyrinth 19 indicating flow out of the plane of the paper and flow into the plane of the paper respectively. Also clearly shown is the sealing gasket 22 and fastening bolt 21 for securing the edges of the collector plate 20 to the top peripheral wall portions of the tray.

FIG. 3 illustrates the diaphragm-absorber plate 20 in its second position wherein it deflects upwardly to provide the expanded mass fluid flow passage, this passage being indicated by the arrows 26. It will be clear that the mass fluid flow can pass directly over the labyrinth channel defined by the ribs as a consequence of the upward deflection of the plate 20 under elevated temperature conditions.

When the diaphragm rises, the flow rate may be increased by more than ten times in response to an increase in temperature of one degree Fahrenheit. For example, in a typical collector, the labyrinth channels are 0.25 inches deep and 1.0 inches wide with a flow cross sectional area of 0.25 square inches. A four foot by eight foot diaphragm will rise approximately 0.1 inch in the center per degree Fahrenheit, and the flow area is increased tenfold to 2.5 square inches as the fluid passes over the knife edges. In addition to the increased flow area, the pressure drop due to friction is reduced when the flow is over the knife edges.

The deflection of the diaphragm plate due to temperature is a function of the material and of the size of the diaphragm. A 48-inch diaphragm made of aluminum will deflect 0.1 inch in the center for a temperature change of 0.8 degrees Fahrenheit. A 48-inch diaphragm made of steel will deflect 0.1 inch in the center for a temperature change of 1.3 degrees Fahrenheit. It requires a temperature of over 20° F. to cause a deflection of 0.5 inches for aluminum and over 30° F. for an equal deflection of steel. The deflected shape will vary depending on the thickness of each material, but the flow area always increases under deflection.

OPERATION

The diaphragm-absorber plate 23 as shown in FIG. 1 rises off of the knife edge supports of the ribs under three conditions:

(1) heating due to solar radiation, such as by the sun S as illustrated in FIG. 1;
(2) heating due to conduction from the fluid when heated fluid passes through the collector; and
(3) excessive pressure at the inlet manifold to the inlet ports 15.

In each of the foregoing cases, the deflection of the diaphragm has a beneficial compensating effect. When the diaphragm is heated by the sun, the resulting higher flow rates give a lower average collector temperature and therefore, higher efficiency. When the diaphragm is heated by the fluid, radiation to the night sky is increased. The over pressure condition is decreased due to greater volume in the collector and due to the higher flow rate.

HEATING MODE OR CYCLE

On a sunny day, fluid will be circulated through the flat-plate collector starting in the mid-morning. The diaphragm-absorber plate will be in a raised position due to solar heating. The flow rate will be high initially until the diaphragm is cooled by conduction to the fluid; that is, heat transfer between the absorber plate and fluid passing thereunder. Thereafter, the diaphragm will assume a quasi-equilibrium position for each transient solar radiation condition, with some flow through the channels and some over the knife edges. Automatic compensation of flow rate with changes in temperature is continuously carried out.

COOLING MODE OR CYCLE

In the cooling mode, heated fluid is circulated through the collector at night. The diaphragm-absorber plate is cooled by radiation of heat exchanged from the flowing fluid to the night sky and/or by evaporative cooling. The fluid will warm the plate and cause the diaphragm to lift off the knife edges; that is, again deflect to its second position. The resulting higher flow rates provide for a greater heat transfer to the plate thereby heating the plate further and yielding a higher heat loss by radiation and conduction.

OVER-PRESSURE PROTECTION

Pressure surges in collectors are common. The causes vary from over-zealous technicians, to bypass valve malfunctions to other equipment failures in the system. A pressure relief valve may not protect a collector if the surge is too abrupt or if the relief valve is too far from the collector. The diaphragm-absorber plate of this invention protects the collector fully from pressure surges and will also increase the burst pressure due to steady state increases in inlet pressure.

Other advantages of the present invention include freezing protection and noise reduction. If water fills the collector in freezing weather, the expansion as ice forms would raise the diaphragm-absorber plate off the knife edges and cause no damage to the collector. If water is flowing through the collector, a ten times larger flow rate slows the freezing rate by the same factor.

As briefly described heretofore, the flow rate in current flat-plate collectors is set high enough to obtain good efficiency at average conditions of radiation. This flow rate remains constant during the entire operating cycle. However, utilizing the self-compensating collector of this invention, peak flow rate at mid-day may be much higher, but the average flow rate is lower, due to the small flow channels in use when the solar radiation is lower. Thus, there results an appreciable noise reduction.

It should be understood that the present invention can be used as a room radiator or heat exchanger as well as a roof collector. Further, the collector itself can work in either a flat or inclined position and may be used with or without glass covers. The collector tray can be made of rigid foam material with the ribs integrally formed in the tray and can be of any desired size or shape. The fluid medium can be either water or air.

The foregoing, coupled with the basic increase in efficiency realizable by the automatic self-compensation and the reliability features as a consequence of protection from freezing and pressure surges, all result in a vastly improved solar collector over those heretofore available.

I claim:

1. A self-compensating solar collector including, in combination:
   (a) a collector tray having an inlet and outlet;
   (b) means in said tray defining a mass fluid flow labyrinth channel between said inlet and outlet; and
   (c) a thermally responsive diaphragm-absorber plate covering said collector tray and movable from a first position confining mass fluid flow to said labyrinth channel, to a second upwardly deflected position in response to heating of the diaphragm to an elevated temperature to free the mass fluid flow from the labyrinth channel to thereby provide an expanded fluid flow path whereby during both cooling and heating, automatic compensation in the mass flow rate of the fluid through the collector with changes in temperature takes place to maintain the collector relatively cool and thereby increase the efficiency of the collector.

2. A solar collector according to claim 1, in which said means includes venting passages providing for direct air flow between said inlet and outlet.

3. A self-compensating solar collector including, in combination:
   (a) an elongated rigid insulating base tray having an open top and inlet and outlet ports passing through opposite transverse end walls;
   (b) a first series of transverse ribs having top knife edges extending from one longitudinal wall of the tray across a major portion of the tray width and terminating short of the opposite longitudinal wall;
   (c) a second series of parallel transverse ribs having top knife edges extending from said opposite longitudinal wall of the tray across a major portion of the tray width and terminating short of said one longitudinal wall, said second series of ribs extending respectively between the first series of ribs in an interdigitating relationship to define a labyrinth flow channel from the inlet ports to the outlet ports; and
   (d) a diaphragm-absorber plate overlying the top of said tray with its periphery sealingly secured to the top of the walls of the tray, said diaphragm being of a material responsive to changes in its temperature to assume a first position when its temperature is below a given value in which its undersurface rests and is supported by said top knife edges of the ribs so that mass flow between the inlet and outlet ports is confined to follow the labyrinth flow channel defined by the ribs, and to assume a second position when its temperature is above a given value in which the diaphragm deflects upwardly so that its undersurface separates from the top knife edges of the ribs to provide an expanded direct longitudinal mass flow path across the tops of the ribs between the inlet and outlet ports in addition to the flow path defined by the labyrinth channel whereby during both cooling and heating cycles, automatic compensation in the mass flow rate of fluid through the collector with temperature variations takes place to maintain the collector relatively cool and thereby increase the efficiency of the collector.

4. A solar collector according to claim 3, including air passage means formed in the top edge portions of said ribs in positions to define a direct longitudinally extending air flow path across the ribs between the inlet and outlet ports whereby air can readily be vented from said collector.

5. A solar collector according to claim 3, in which said tray is rectangular and made of a rigid foam, the ribs being integrally formed in the tray, said absorber-diaphragm comprising a thin metal plate having a heat absorbing and emitting coating on its top surface.

* * * * *